United States Patent
Lin et al.

(10) Patent No.: US 7,447,527 B2
(45) Date of Patent: Nov. 4, 2008

(54) HANDHELD ELECTRONIC DATA PROCESSING DEVICE WITH MULTIPLE OPERATION MODES FOR DIFFERENT FUNCTIONS

(75) Inventors: Chi-Hsiung Lin, Banciao (TW); Hsiang-Ti Hsu, Yonghe (TW)

(73) Assignee: Lite-On Technology Corporation, Taipei (TW)

( * ) Notice: Subject to any disclaimer, the term of this patent is extended or adjusted under 35 U.S.C. 154(b) by 465 days.

(21) Appl. No.: 11/092,686

(22) Filed: Mar. 30, 2005

(65) Prior Publication Data

US 2006/0135225 A1    Jun. 22, 2006

(30) Foreign Application Priority Data

Dec. 22, 2004   (TW) ................ 93220685 U

(51) Int. Cl.
*H04B 7/15* (2006.01)
(52) U.S. Cl. .............. 455/575.1; 455/566; 455/556.2
(58) Field of Classification Search .......... 455/575.1, 455/575.3, 575.2, 566, 556.2, 575.4
See application file for complete search history.

(56) References Cited

U.S. PATENT DOCUMENTS

| | | | |
|---|---|---|---|
| 6,549,789 B1 * | 4/2003 | Kfoury | 455/550.1 |
| 6,728,557 B1 | 4/2004 | Tracy et al. | |
| 6,839,576 B2 * | 1/2005 | Aagaard et al. | 455/575.1 |
| 6,980,424 B2 * | 12/2005 | Kim et al. | 361/683 |
| 7,130,186 B2 * | 10/2006 | Yu | 361/681 |
| 7,239,898 B2 * | 7/2007 | Lenchik et al. | 455/575.1 |
| 2004/0110529 A1 | 6/2004 | Watanabe et al. | |
| 2004/0132482 A1 | 7/2004 | Kang et al. | |
| 2004/0185922 A1 * | 9/2004 | Sutton et al. | 455/575.1 |
| 2004/0192422 A1 | 9/2004 | Watanabe et al. | |
| 2004/0198474 A1 | 10/2004 | Jung et al. | |
| 2004/0203517 A1 | 10/2004 | Park et al. | |
| 2004/0203532 A1 | 10/2004 | Mizuta | |
| 2004/0203535 A1 | 10/2004 | Kim et al. | |
| 2004/0209645 A1 | 10/2004 | Park et al. | |
| 2005/0026658 A1 * | 2/2005 | Soejima | 455/575.1 |
| 2005/0054396 A1 * | 3/2005 | Yang | 455/575.3 |
| 2005/0064919 A1 * | 3/2005 | An et al. | 455/575.3 |
| 2005/0136970 A1 * | 6/2005 | Kim | 455/550.1 |
| 2005/0245296 A1 * | 11/2005 | Hong et al. | 455/575.3 |
| 2006/0063571 A1 * | 3/2006 | Chadha | 455/575.3 |
| 2006/0135222 A1 * | 6/2006 | Kim | 455/575.1 |

OTHER PUBLICATIONS http://www.besta.com.tw/indexb.htm, Feb. 25, 2005.

(Continued)

*Primary Examiner*—Blane J Jackson
(74) *Attorney, Agent, or Firm*—Rabin & Berdo, P.C.

(57) ABSTRACT

A handheld electronic data processing device includes a first body, a second body and a hinge seat. The first body has a first keypad and a second keypad located in different directions. The second body has a display screen. The first body and the hinge seat are coupled through a first hinge such that the hinge seat is rotatable relative to the first body about a first rotational axis. The second body and the hinge seat are coupled through a second hinge such that the second body is rotatable about two rotational axes relative to the hinge seat. Thereby the second body may be swiveled relative to the first body about three rotational axes to provide varying operation modes corresponding to different functions.

9 Claims, 9 Drawing Sheets

OTHER PUBLICATIONS http://h10025.www1.hp.com/ewfrf/wc/product?lc=en&lang=en&cc=us&dest_page=product&dlc=en&product=61677, Mar. 10, 2005.

http://www.instant.com.tw/instantdir/product/product_md1000_1.asp, Feb. 25, 2005.

http://ezaurus.com, Feb. 25, 2005.

http://commerce.motorola.com/consumer/QWhtml/m_v600.htm, Feb. 25, 2005.

http://www.nokia.com./nokia/0,,62355,00.html, Feb. 25, 2005.

http://www.motorola.com/motoinfo/product/images/0,48,00html, Feb. 25, 2005.

* cited by examiner

HANDHELD ELECTRONIC DATA PROCESSING DEVICE WITH MULTIPLE OPERATION MODES FOR DIFFERENT FUNCTIONS

FIELD OF THE INVENTION

The invention relates to an electronic device for mobile communication and data processing, and particularly to a handheld electronic data processing device that has a plurality of operation modes for different functions.

BACKGROUND OF THE INVENTION

Nowadays a PDA phone or smart phone can integrate the functions of a mobile phone and a personal digital assistant (PDA) to provide mobile communication and mobile data processing functions. As operation of functions of mobile communication and data processing are different, the PDA phone or smart phone also has to provide different operation modes for these two functions.

The mobile phone function has to include a display screen and a phone keypad. The display screen aims to provide related information for mobile communication, including incoming and outgoing phone calls numbers, service provider information, short messages, and the like. The phone keypad aims to take calling phone, dial phone numbers, and edit short messages according to input methods dedicated to the phone keypad.

The PDA has to include a touch screen to display information. Input is mainly performed by direct selection from a menu on the screen through a stylus and a proprietary PDA program. Input of characters may be done by hand writing through the stylus and the touch screen, or done by a virtual keyboard on the screen. An external QWERTY keypad may also be used to enter input like on a personal computer. In order to speed up input on the PDA, besides the QWERTY keypad, also being developed are hosts with flip covers like miniature notebook computers. Such devices have a display screen and a host body that are separated and hinged on the body. The host body has a QWERTY keypad. When in use, the host may be placed on a desktop, and the display screen may be flipped upwards on the elongated side of the host body to make data entry on the QWERTY keypad easier. For instance, CD-616 and CD-72 electronic dictionaries produced by INVENTEC BESTA Co., Ltd. (reference can be found in http://www.besta.com), MD1000 electronic dictionary produced by INSTANT-DICT Co., Ltd. (reference can be found in http://www.instant.com.tw), Jornada 720 Handheld PC computers produced by Hewlett-Packard Development Company, L.P. (reference can be found in http://www.hp.com) and Zaurus SL-C3000 handheld PDA produced by Sharp Co. (reference can be found in http://ezaurus.com) are portable data processing devices equipped with QWERTY keypads that look like miniature notebook computers.

To meet the requirements of multimedia applications (such as games, videos, movies, music, and the like) and mobile communication, many manufacturers have introduced flip mobile phones or PDAs that integrate multiple functions, such as MOTORLA model V600 mobile phone (reference can be found in http://www.motorola.com), NOKIA model 7270 mobile phone (reference can be found in http://www.nokia.com). The flip mobile phone or PDA provides a larger display screen or other operation modes (such as including a keypad for data entry). The flip mobile phone has a phone keypad on the host and a flip cover containing a display screen. The flip cover is coupled on the top end of the host through a one-way hinge for opening or folding relative to the host. Although the flip cover can accommodate a larger display screen, the one-way hinge allows the flip cover to swivel only one way, thus limiting the operation mode and creating many inconveniences. For example, when using the keypad for data entry the keypad is narrow and suitable for only one hand input operation after the flip cover is opened, so input speed is limited. Moreover, the keypad mostly adopts a design with shared keys for the phone keypad and QWERTY keypad. Built-in firmware or software must be included to switch the setting for varying input requirements. If a stylus is used to operate on the touch screen, the keypad on the host cannot be hidden behind the display screen. Unconsciously hitting the buttons often occurs and results in interference to the touch screen.

These days many new mobile phones are equipped with dynamic video and still photography functions. To provide a desired photo mode or other operation modes, the mobile phone with a host and a flip cover coupled by a biaxial hinge has been developed. Reference can be found in U.S. patent publication Nos. 20040110529, 20040132482, 20040192422, and 20040198474. These all provide a mobile phone equipped with a biaxial hinge to enable the flip cover to be swiveled about two rotational axes relative to the host so that the display screen may be turned with its back side folding over the host. Therefore the mobile phone may be used like a digital camera.

As the PDA phone or smart phone that integrates the functions of mobile communication and PDA generally adopts the structure of the mobile phone or PDA, the biaxial hinge mentioned above is also used on the PDA phone or smart phone to provide different operation modes. For instance, to use the mobile phone function, the flip cover is generally lifted so that the phone keypad may be used for operational control, and the phone is moved close to the user's face during the phone conversation. To use the PDA in a handheld operation mode, the functions of the operation are performed by touching the display screen with the stylus. The host body becomes an obstacle in such a situation, so the display screen may be swiveled with its back side folding over the host. Reference to mobile phones or smart phones that adopt the biaxial hinge to swivel the display screen can be found in U.S. patent publication Nos. 20040203532, 20040203535, and 20040209645.

The buttons on a typical mobile phone are organized on a phone keypad. Although they may be used to enter characters through software settings, input operation is inconvenient and data entry is slow. Operation by selecting the menu on the touch screen on the PDA is fast, but data input on the virtual keyboard shown on the display screen or through the hand writing mode takes time that slows down the process and creates inaccuracy. To remedy these problems, external QWERTY keyboards have been developed. But the external QWERTY keyboard is not convenient to carry hence it is not suitable for portable electronic devices. The flip cover design that imitates the notebook computer previously discussed usually has the longer side of the host as the rotational axis of the flipping direction, but the mobile phone generally uses the shorter side of the host as the rotational axis of the flipping direction. Hence the design of the flip cover that imitates the notebook computer does not conform to the general use habit of the mobile phone.

U.S. patent publication No. 20040203517 provides a smart phone with an improved design for the QWERTY keypad. It includes a main body and a sub-body. The main body has a QWERTY keypad on two sides of its surface. The sub-body contains a display screen and a phone keypad. In the mobile phone operation mode, the sub-body covers the QWERTY keypad on one side. In the PDA operation mode, the sub-body may be swiveled horizontally ninety degrees to make the sub-body normal to the main body. Such a design has the striking surface of the QWERTY keypad parallel to the display screen. When placed on the desktop for operation, the display screen on the sub-body is also parallel to the desktop. Users have to lower their heads to see the display screen, which causes physical strain.

In addition, MOTOROLA has introduced a smart phone model MPx(reference can be found in http://www.motorola.com). It has a display screen and a host. The host has a QWERTY keypad and a phone keypad. A detachable hinge is provided so that the display screen can be selectively hinged on a longer side or a shorter side of the host to provide the mobile phone operation mode or the QWERTY keypad input mode for PDA. However, switching is done by detaching and is inconvenient. Moreover, frequent detachment causes wearing of elements and damaging of the hinge. Also, operation of the PDA may be done in handheld touch operation mode and QWERTY keypad input mode. In the handheld touch operation mode the display screen overlaps with the host, and the keypad is hidden on the back side of the display screen to expose the display screen and avoid interrupting operation of the host or mistakenly striking the keypad. The design of the MPx model cannot hide the keypad or overlap the keypad with the host. U.S. Pat. No. 6,728,557 discloses a L-shaped hinge on the juncture of the top side and lateral side of a host to pivotally couple with a flip cover on the juncture of a top edge and side edge thereof. The flip cover may be lifted from the top edge or the side edge to form two different operation modes. Its operation is like providing a flip cover for a mobile phone and notebook computer at the same time. It also has the same drawbacks occurring with the MPx model mentioned above. Namely, in the handheld operation mode for PDA, the keypad cannot be fully hidden under the flip cover, and operation interference and unconsciously hitting of the buttons still occur.

All the conventional techniques mentioned above employ a one-way or biaxial hinge to switch the coupling relationship of the flip cover and the host to provide a mobile phone operation mode or PDA operation mode. The mobile phone operation mode is simpler and can be satisfied by the general flip cover design. The PDA operation mode is more complicated and requires a QWERTY keypad to speed up data entry. To increase the speed of data entry, the keypad and the display screen should form an inclined angle between them to make it easier for users to see the display screen during operation. On the other hand, in the handheld touch operation mode, the host and the flip cover should be overlapped to cover the keypad to facilitate holding and touch operation. All the conventional techniques previously discussed cannot meet these requirements at the same time and provide the optimal operation modes. There is still room for improvement in the design of the PDA phone or smart phone.

SUMMARY OF THE INVENTION

In view of the aforesaid problems occurring with conventional mobile phones, PDAs or smart phones that have a one-way hinge or biaxial hinge to allow the flip cover to move relative to the host to provide different operation modes, but still cannot offer an optimal operation condition in some operation modes for multifunctional electronic devices, the primary object of the invention is to provide a handheld electronic data processing device that offers multiple operation modes in an optimal operation condition to perform varying functions.

In order to achieve the aforesaid object, the handheld electronic data processing device according to the invention includes a first body, a second body, a hinge seat, a first hinge and a second hinge. The first body has a transverse first keypad and a longitudinal second keypad corresponding to operation modes in different directions. The first hinge is located on the juncture of two lateral sides of the first body. The hinge seat is coupled on the first body through the first hinge and is rotatable about a rotational axis relative to the first body at an angle or foldable over the first body. The second body is coupled on the hinge seat through the second hinge and is rotatable about two rotatable axes relative to the hinge seat. Through the coupling relationship of the hinge seat and the first body, the second body may be swiveled indirectly relative to the first body about three different rotational axes, so that the second body may be coupled with the first body on different sides to form a flip cover at an angle or folding over the first body. Thereby the display screen may selectively face the first body, or the back side of the display screen may be folded over the first body. Thus varying operation modes may be switched as desired and an optimal operation may be provided for each operation mode, such as handheld touch operation for the PDA, data entry operation on the QWERTY keypad with the transverse flip cover, or phone taking and dialing operations for the mobile phone with the longitudinal flip cover.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
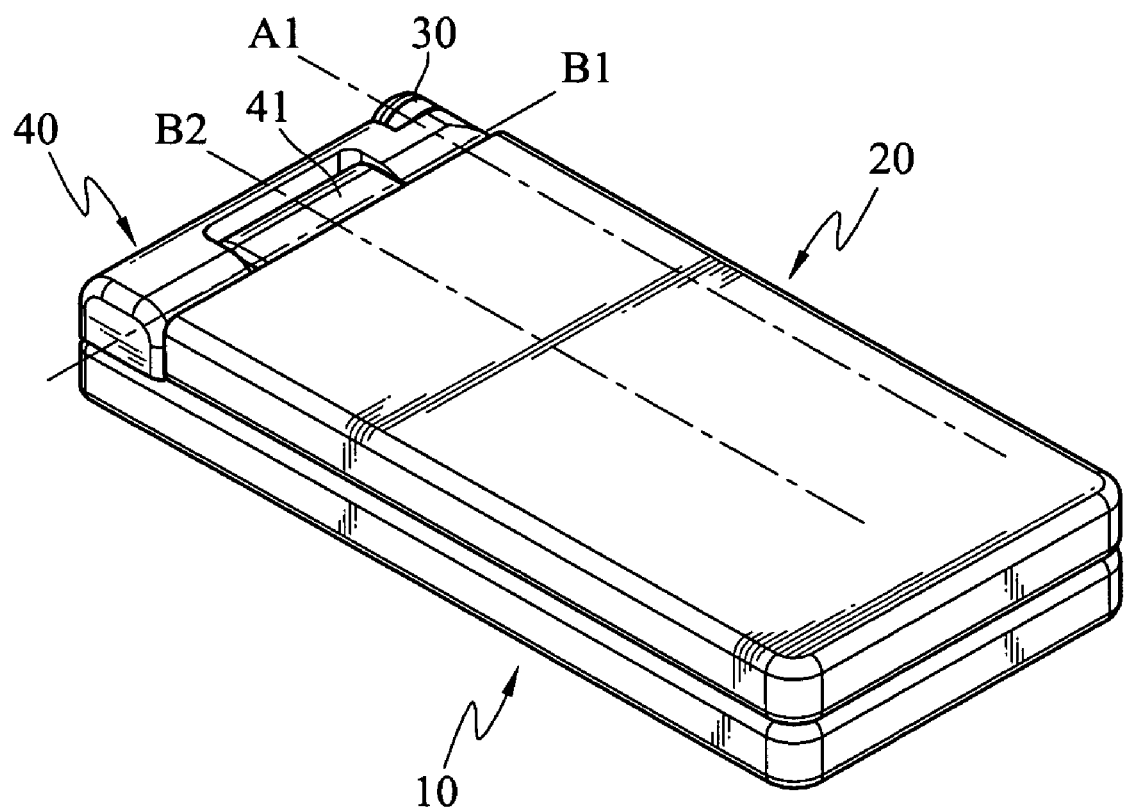
FIGS. 1 through 5 are schematic views of the invention in different use conditions.

Referring to FIGS. 1 through 5, the handheld electronic data processing device according to the invention includes a first body 10, a second body 20, a hinge seat 40, a first hinge 30 and a second hinge 41.

The first body 10 is rectangular with a longitudinal direction defined by the long side and a transverse direction defined by the short side. The first body 10 has a first keypad 11 and a second keypad 12 on one surface. The first keypad 11 is located in a direction corresponding to the long side of the first body 10. That is, the marked characters on the first keypad 11 are parallel to the longitudinal direction of the first body 10, so that when a user looks at the first body 10 in the transverse direction, the printed characters on the first keypad 11 corresponds to the user's visual direction. The second keypad 12 is located in a direction corresponding to the short side of the first body 10. That is, the marked characters on the second keypad 12 are parallel to the transverse direction of the first body 10, so that when the user looks at the first body 10 in the longitudinal direction, the printed characters on the second keypad 12 corresponds to his or her visual direction.

The first hinge 30 is located on the juncture of the long side and the short side of the first body 10 with a rotational axis, and on the same surface as the first and second keypads 11 and 12.

Figure 2:
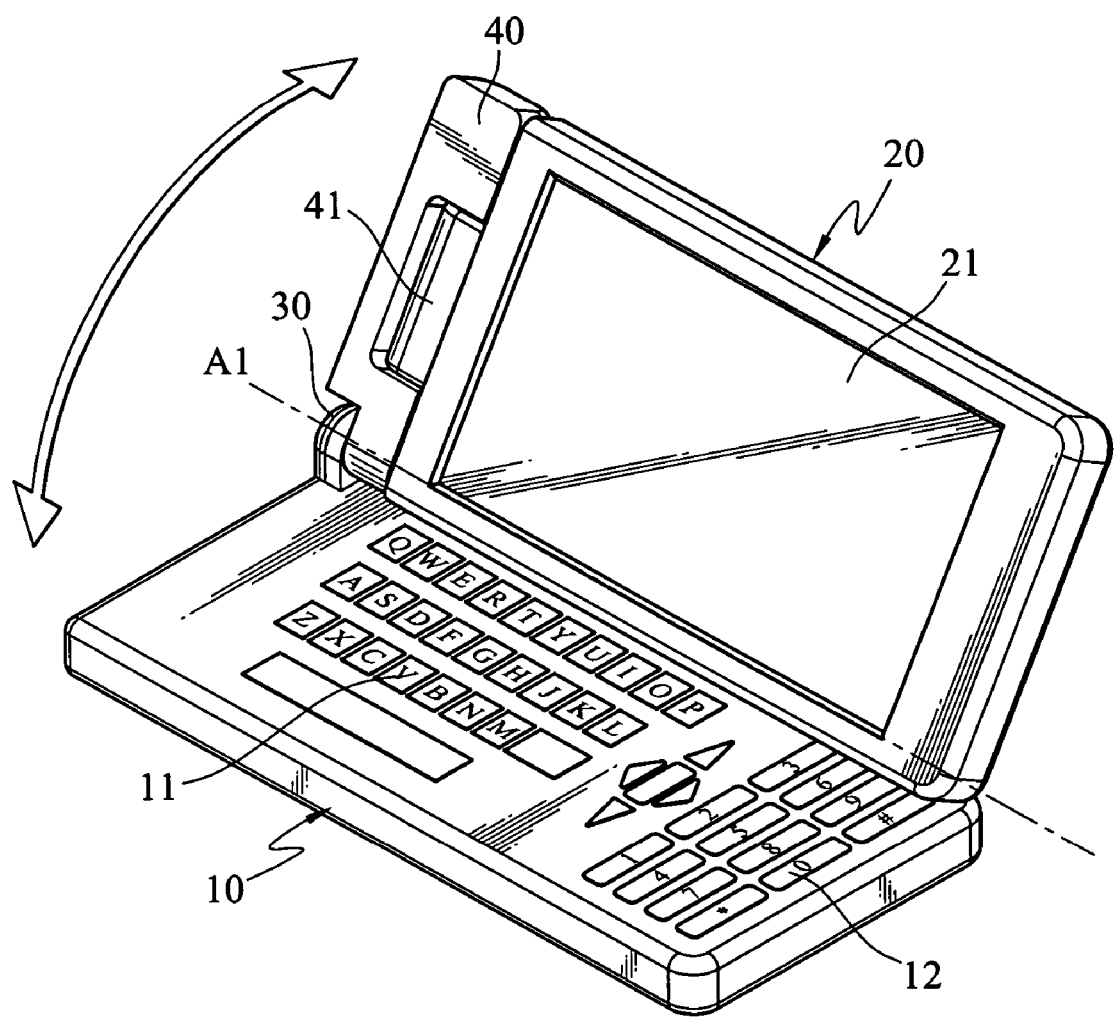

The hinge seat 40 is rectangular and has one end coupling with the first hinge 30. The hinge seat 40 is rotatable about the first hinge 30 relative to the first body 10. Referring to FIG. 2, the hinge seat 40 is rotatable about a first rotational axis A1, which is parallel to the longitudinal axis of the first body 10 such that the hinge seat 40 may be folded flatly on the shorter side of the surface of the first body 10 where the first and second keypads 11 and 12 are located, or be lifted relative to the first body 10 to form an angle between the first body 10 and the hinge seat 40.

The second hinge 41 is located in the middle portion of one side of the hinge seat 40. The second hinge 41 is a biaxial hinge that includes a second rotational axis B1 parallel to the long side of the hinge seat 40 and a third rotational axis B2 normal to the second rotational axis B1.

The second body 20 is rectangular and slightly smaller than the first body 10, but is larger than the area covered by the first and second keypads 11 and 12. The second body 20 and the hinge seat 40 form an area covering one entire surface of the first body 20. The second body 20 has a display screen 21 on one surface. The second body 20 also has a short side coupling with the second hinge 41 of the hinge seat 40, so that the second body 20 may be swiveled relative to the hinge seat 40 about two axes. It is swiveled about the second rotational axis B1 as a flip cover, or swiveled about the third rotational axis B2 to switch the positions of the top and the bottom surfaces of the second body 20.

Figure 3:
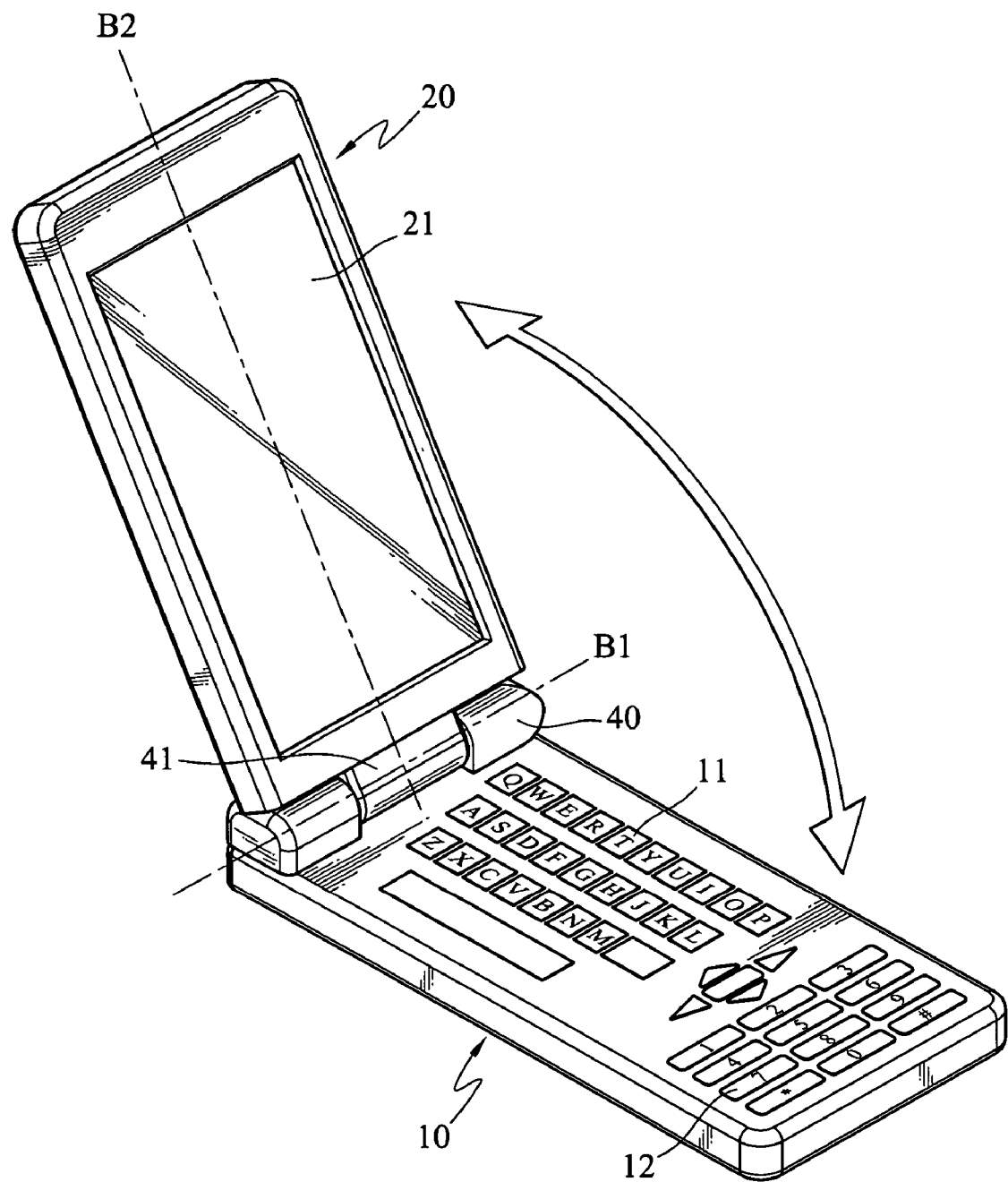

Since the second body 20 is coupled with the hinge seat 40, when the hinge seat 40 is swiveled relative to the first body 10, the second body 20 is driven and swiveled, so that the second body 20 may also be swiveled relative to the first body 10. That is, the second body 20 may be swiveled about the first rotational axis A1 or the second rotational axis B1 as a flip cover with different abutting sides of the first body 10, as shown in FIGS. 2 and 3. The second body 20 may also be swiveled about the third rotational axis B2, as shown in FIG. 4, to selectively move the display screen 21 to face or oppose the first body 10, and to be close to and folded over the first body 10, as shown in FIGS. 1 and 5.

Figure 4:
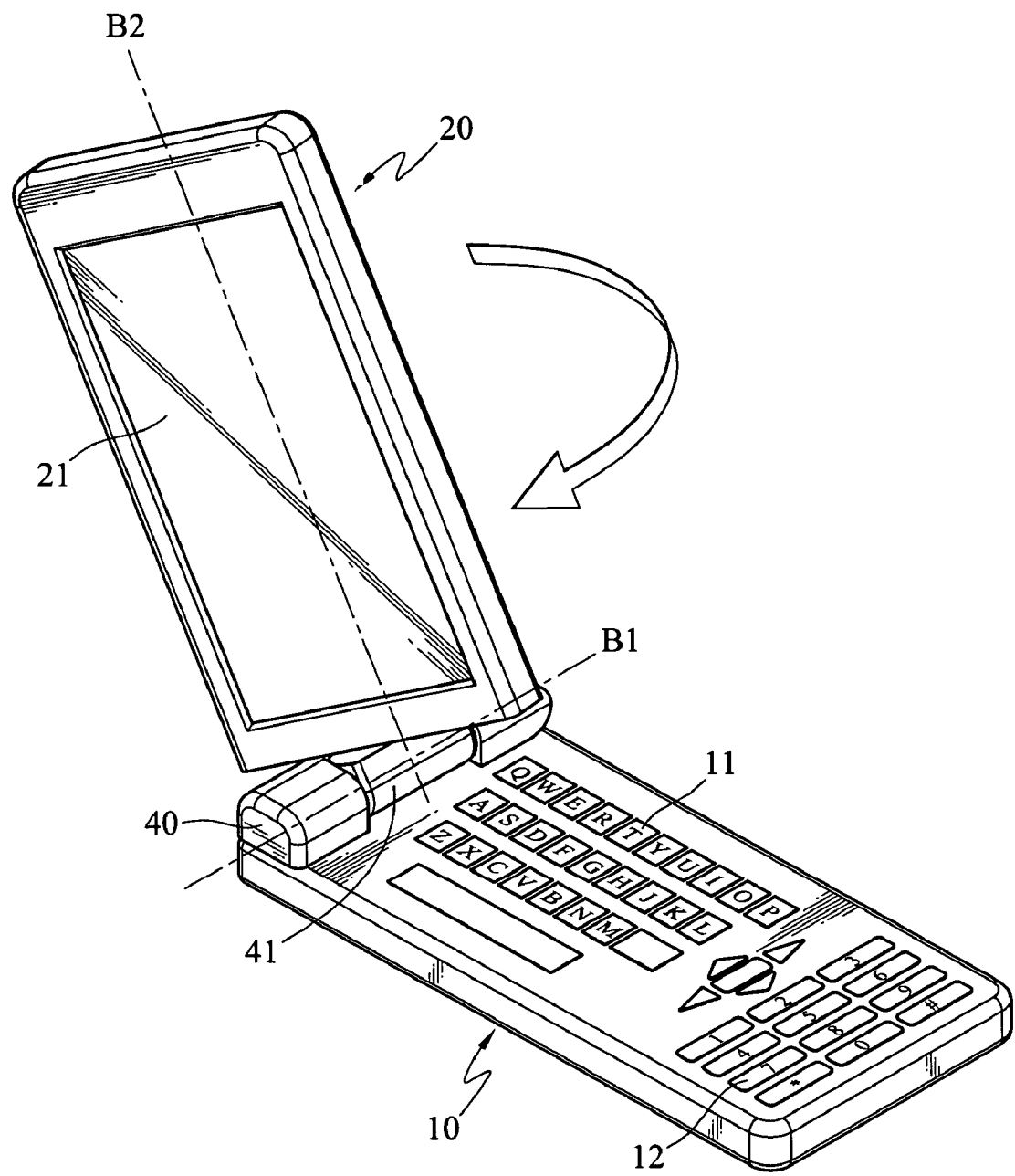
Figure 5:
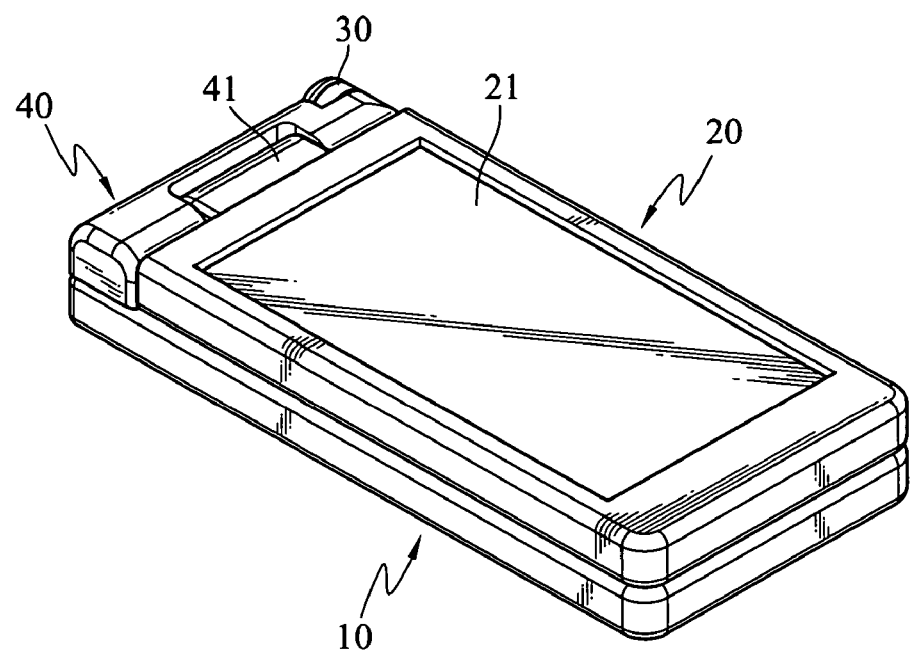

The second body 20 may be swiveled about two rotational axes (the second and third rotational axes B1 and B2) relative to the hinge seat 40, as shown in FIGS. 3 and 4, and swiveled about one rotational axis (first rotational axis A1) relative to the first body 10, as shown in FIG. 2. Thus through the coupling relationship generated by the hinge seat 40, the second body 20 may be swiveled indirectly relative to the first body 10 about three different rotational axes. Compared with the conventional electronic devices, which can be swiveled about a maximum of two rotational axes, the invention provides more versatility to suit varying operation modes, as shown in FIGS. 2, 3 and 5, and provide different functions required for the handheld electronic data processing device.

Refer to FIGS. 6A through 6E for an embodiment of the handheld electronic data processing device of the invention adopted for use on a PDA phone (or a smart phone), that integrates the functions of a mobile phone and PDA for data processing and storing. For the requirements the mobile phone operation mode, at least one phone keypad is included to take phone calls and perform dialing. The phone keypad includes at least 0-9, #, *, receive or OFF buttons to make a phone call. Audio input and output devices also are required for phone conversation. For the PDA function, at least a stylus input operation mode or a QWERTY keypad input operation mode is required. The QWERTY keypad includes at least A-Z, Enter, Space-bar, Backspace, or Delete buttons.

Figure 6A:
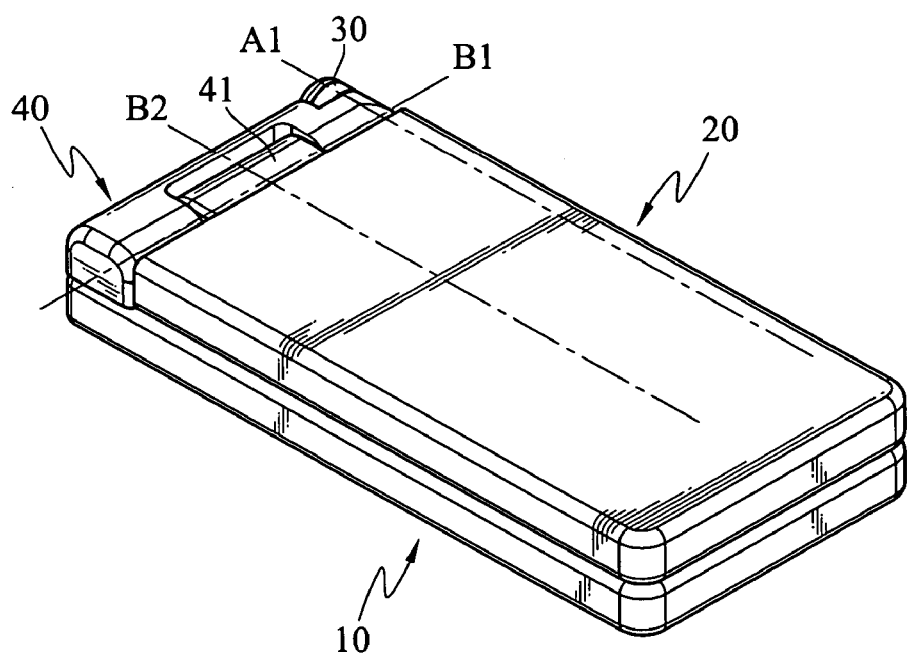
FIGS. 6A and 6E are schematic views of an embodiment of the invention in different operation modes.
Figure 6B:
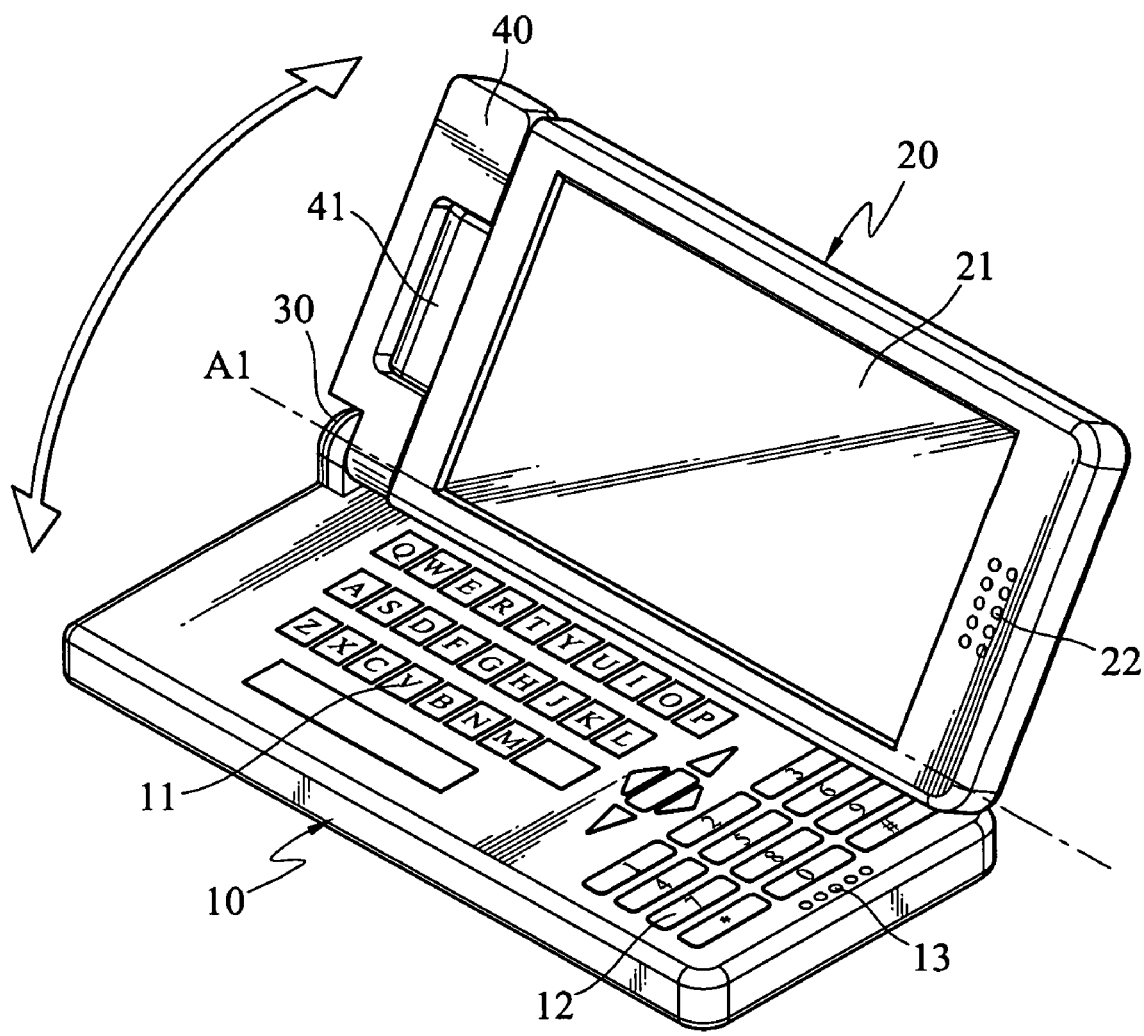

The first body 10 is the host of the PDA phone. The first keypad 11 is a QWERTY keypad. The second keypad 12 is a phone keypad. The second body is the flip cover of the PDA phone. The display screen 21 is a touch screen that is pressure-sensitive to perform touch operations, as shown in FIGS. 6A and 6B. In addition, to perform the mobile phone function, the first body 10 has an audio input port 13 on one short side, and the second body 20 has an audio output port 22 abutting one edge of the display screen 21. To fully function as a PDA phone, at least three operation modes must be included: 1. held longitudinally by one hand to function as a mobile phone; 2. positioned transversely to function as a PDA to perform data entry on the QWERTY keypad; 3. held longitudinally by one hand with the touch display screen exposed and hiding the unnecessary buttons or jutting elements such as the phone keypad and QWERTY keypad.

Hence when the invention is adopted for use as a PDA phone or smart phone, at least the following operation modes are provided:

First mode: referring to FIGS. 6A and 6B, the hinge seat 40 is swiveled about the first rotational axis A1 to move the display screen 21 of the second body 20 to face the first body 10 and cover the first and second keypads 11 and 12; or the hinge seat 40 is swiveled to form an angle with the first body 10, and the second body 20 is driven at the same time to enable one long side of the second body 20 to be coupled with one long side of the first body 10 to form an angle, so that the first body 10 may be rested transversely on a desktop, with the first keypad 11 corresponding to the user's sight line to function as a notebook computer. A user can use the first keypad 11 to perform input and operation.

Figure 6C:
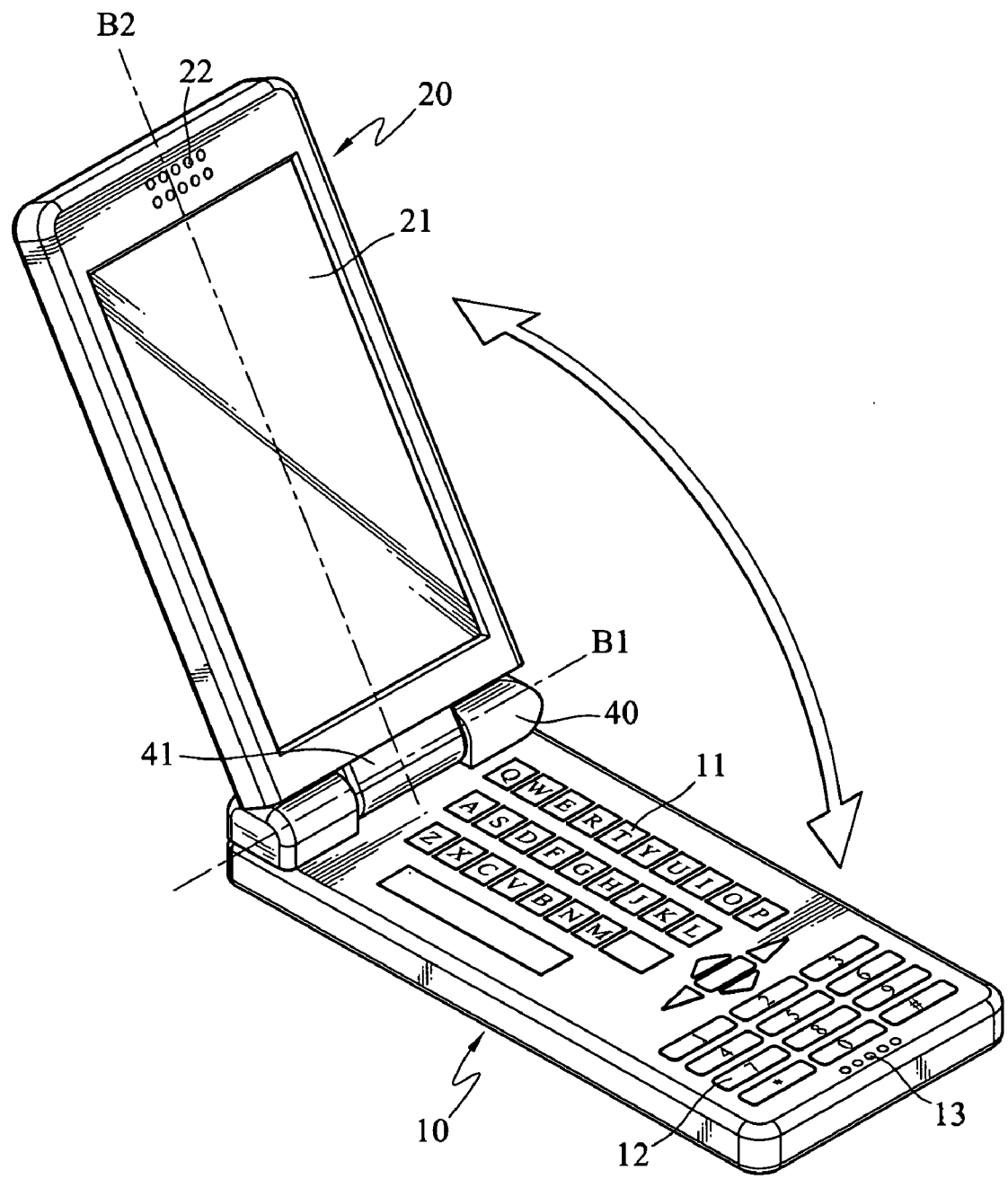

Second mode: referring to FIGS. 6A and 6C, the display screen 21 of the second body 20 initially covers one surface of the first body 10 where the first and second keypads 11 and 12 are located to form a folding and storing condition, as shown in FIG. 6A. Referring to FIG. 6C, when the hinge seat 40 is close to the first body 10, the second hinge 41 of the hinge seat 40 may be swiveled about the second rotational axis B1 to move one short side of the second body 20 close to the first body 10 such that the first and second body 10 and 20 form an angle therebetween, and a flip mobile phone is formed so that a user can put his/her ear close to the audio output port 22 and his/her mouth close to the audio input port 13 to receive and deliver signals like a mobile phone. In addition, the user can longitudinally hold the handheld electronic data processing device of the invention with the second keypad 12 facing his or her sight line to receive calls or dial phone numbers. The display screen 21 can display messages indicating the mobile phone operation condition, such as the calling phone number or the dialing phone number, the short message service, and the like.

Figure 6D:
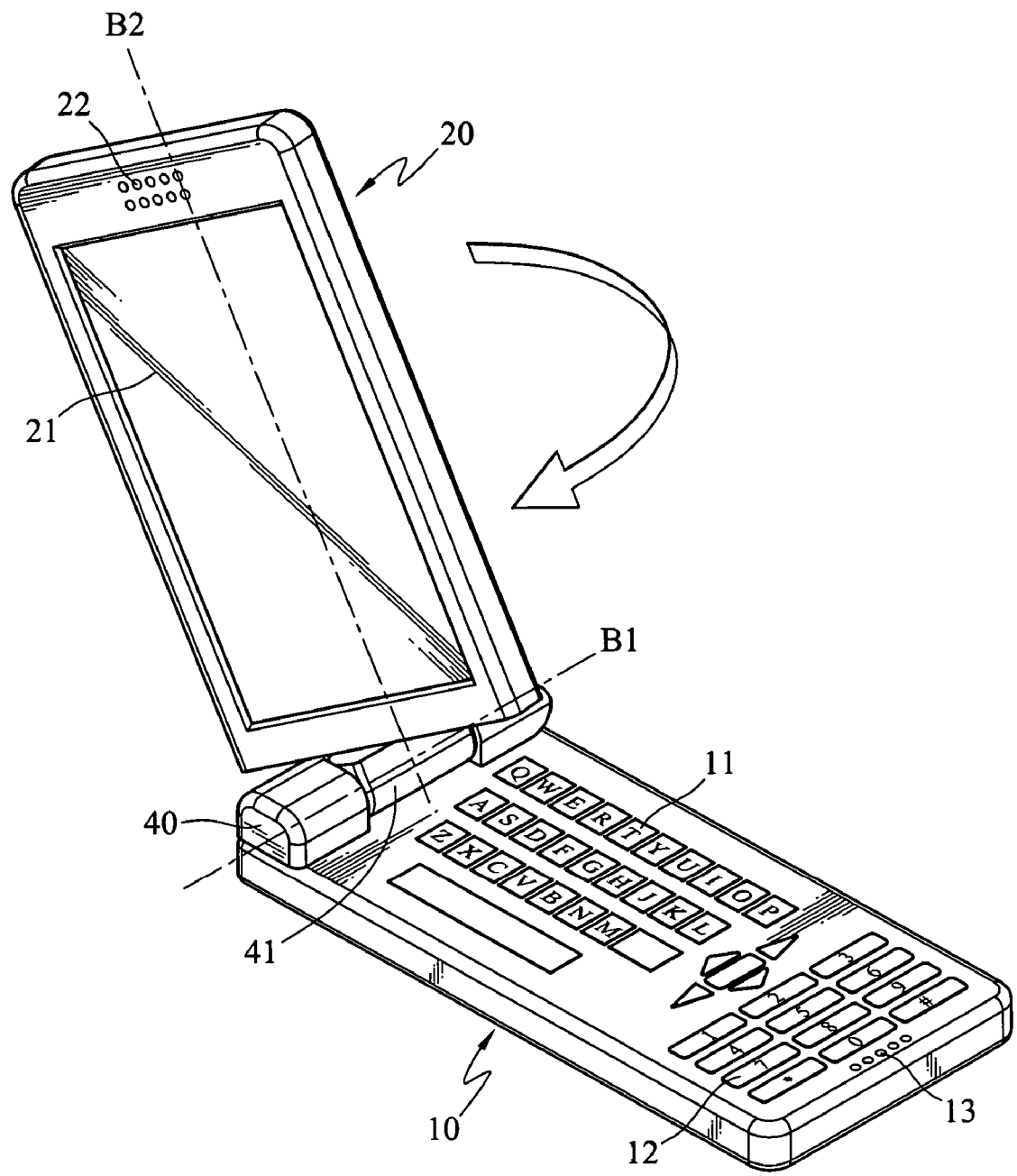
Figure 6E:
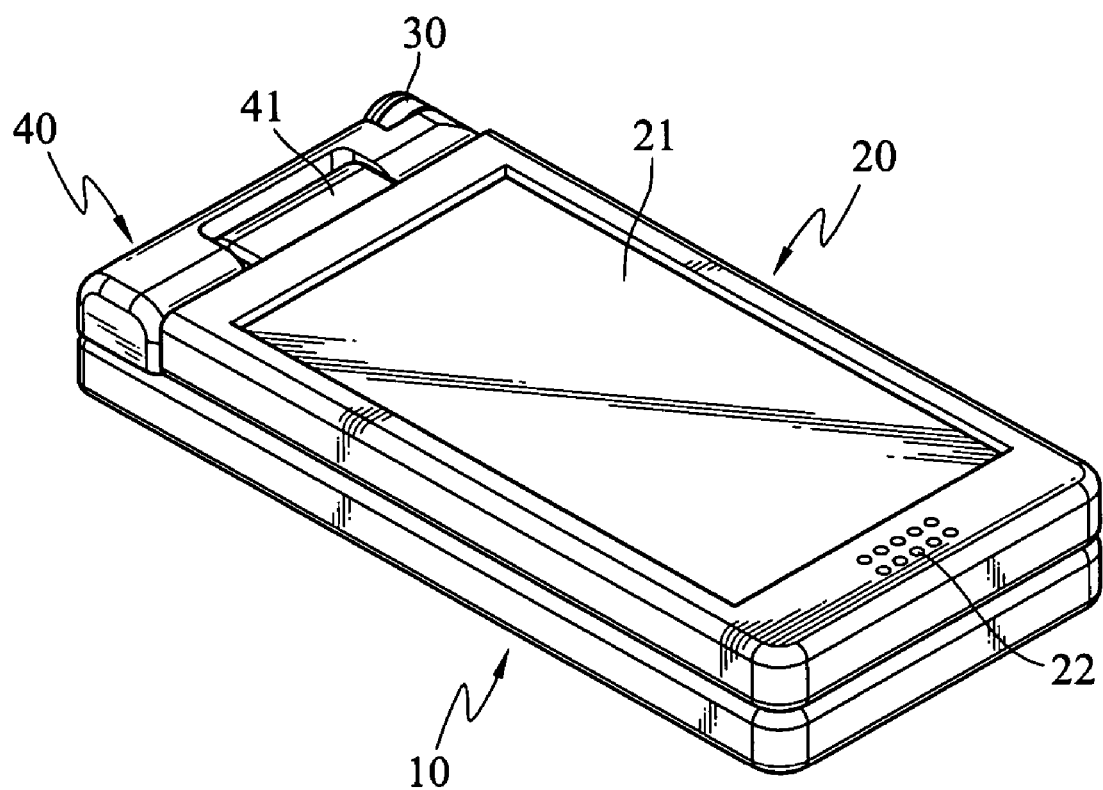

Third mode: referring to FIGS. 6A, 6D and 6E, the second body 20 is initially turned about the second rotational axis B1 to be lifted relative to the first body 10; it is then swiveled about the third rotational axis B2 to switch the two surfaces of the second body 20 and fold over the first body 10 with the display screen 21 facing outside to become a PDA. The display screen 21 can receive input from a stylus to execute operation. As the touch control mode does not require the first and second keypads 11 and 12, they are covered and hidden by the second body 20 to avoid unconsciously hitting and erroneous operation. The first body 10 and the second body 20 are folded to a thickness and size to be held in the palm.

Although the three operation modes set forth above are available individually on the present mobile phone, PDA or PDA phone or smart phone, they do not coexist simultaneously in one mobile phone, PDA or PDA phone or smart phone. The invention, by coupling the first body 10 and the second body 20 with the hinge seat 40, enables the second body 20 to be swiveled about three rotational axes relative to the first body 10, hence enabling the handheld electronic data processing device to be equipped with a plurality of operation modes.

What is claimed is:

1. A handheld electronic data processing device, comprising:
    a first body having a first side and a second side formed at an angle with respect to the first side to form a juncture;
    a first hinge provided at the juncture of the first side and the second side of the first body;
    a hinge seat pivotally coupled to the first hinge to rotate about a first rotational axis parallel to the first side;
    a second hinge pivotally coupled to the hinge seat to rotate about a second rotational axis parallel to the second side; and
    a second body pivotally coupled to the second hinge to rotate about a third rotational axis which is formed an angle with respect to the second rotational axis.

2. The handheld electronic data processing device of claim 1, wherein the first side is connected to the second side, and wherein the juncture of the first body is at the intersection of the first side and the second side.

3. The handheld electronic data processing device of claim 2, further comprising a first keypad and a second keypad, wherein the first keypad, the second keypad and the first hinge are positioned on a surface of the first body, wherein a first character is printed on the first keypad, and wherein a second character whose visual direction is perpendicular to that of the first character is printed on the second keypad.

4. The handheld electronic data processing device of claim 3, wherein the first keypad is a QWERTY keypad.

5. The handheld electronic data processing device of claim 3, wherein the first keypad is a phone keypad.

6. The handheld electronic data processing device of claim 3, wherein the second body has a display screen.

7. The handheld electronic data processing device of claim 6, wherein the display screen is a touch screen.

8. The handheld electronic data processing device of claim 1, wherein the first body has an audio input port provided on a lateral side thereof.

9. The handheld electronic data processing device of claim 1, wherein the third rotational axis is perpendicular to the second rotational axis.

* * * * *